United States Patent
Furuta

(10) Patent No.: US 6,246,869 B1
(45) Date of Patent: Jun. 12, 2001

(54) MOBILE TRANSMISSION SYSTEM

(75) Inventor: Takehiro Furuta, Yokosuka (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 0 days.

(21) Appl. No.: 09/295,494

(22) Filed: Apr. 21, 1999

(30) Foreign Application Priority Data

Apr. 28, 1998 (JP) .................................................. 10-119559

(51) Int. Cl.[7] .................................................. H04M 11/00
(52) U.S. Cl. .......................................... 455/403; 455/560
(58) Field of Search ..................................... 455/403, 422, 455/445, 560, 561, 439, 436, 438

(56) References Cited

U.S. PATENT DOCUMENTS 5,950,134 * 9/1999 Agrawal et al. ..................... 455/439

FOREIGN PATENT DOCUMENTS

| 0727888 | 8/1996 | (EP) . |
| 9-051569 | 2/1997 | (JP) . |
| 97/16043 | 5/1997 | (WO) . |
| 97/29566 | 8/1997 | (WO) . |

OTHER PUBLICATIONS

Masami Yabusaki et al., "Voice Communication Connection Control in Digital Public Land Mobile Networks".
IEICE Transactions on Fundamentals of Electronics, Communications and Computer Sciences, JP, Institute of Electronics Information and Comm. Eng. Tokyo, Vol. E75–A, No. 12, XP000339157, published on Dec. 1, 1992, pp. 1702–1709.
English Language Abstract of –JP–9–051569.

* cited by examiner

Primary Examiner—Marsha D. Banks-Harold
(74) Attorney, Agent, or Firm—Greenblum & Bernstein, P.L.C.

(57) ABSTRACT

A voice processing device 103 is connected to both an exchange controlling station 101 and a wireless controlling station 102 by a first data line 205 and a second data line 207, which are independent from each other. A CPU 111 of the exchange controlling station 101, a CPU 121 of the wireless controlling station 102 and a CPU 131 of the voice processing device 103 are connected by a bus-type control line 208. By controlling the voice processing device 103 by both the exchange controlling station 101 and the wireless controlling station 102, it is possible to prevent overlapping investment in facilities.

6 Claims, 6 Drawing Sheets

MOBILE TRANSMISSION SYSTEM

BACKGROUND OF THE INVENTION

1. Field of the Invention

The present invention relates to a mobile transmission system having a voice processing device.

2. Description of the Related Art

In a conventional mobile transmission system, since data volume is tremendously increased if usual voice signals used in public telephone lines are used, as they are, in a wireless range, a voice processing device is employed to convert voice signals to coded voice signals in order to compress the data volume, wherein wireless transmission is carried out.

FIG. 1 is a block diagram of a conventional mobile transmission system.

As shown in FIG. 1, the conventional mobile transmission system mainly consists of an exchange controlling station 11, wireless controlling stations 12, voice processing devices 13, and base stations 14. The exchange controlling station 11 mutually connects a plurality of wireless controlling stations 12 to the main network 15 of public telephone lines. Furthermore, the wireless controlling station 12 controls wireless channels of the base stations 14.

In the conventional mobile transmission system, the voice processing devices 13 are connected to the wireless controlling stations 12, wherein voice signals are converted by controlling the wireless controlling stations 12.

Herein, in line with the recent popularization of mobile transmission and progress of mobile transmission technologies, requests for a new control occur in the mobile transmission system. As one of the requests, a voice processing device is connected to the exchange controlling station, wherein it is considered that, by causing the exchange controlling station to control the voice processing devices, voice processing devices which are, respectively, connected to a plurality of wireless controlling stations are collected at one point, in order to increase efficiency of voice processing.

However, in the existing mobile transmission system, if voice processing devices also are connected to the exchange controlling station, the voice processing devices at the wireless controlling station side will be made useless. Furthermore, once the voice processing devices at the wireless controlling station side are disused, they will be no longer used in a case where the voice processing devices are desired to be utilized at the wireless controlling station side due to changes in the transmission system in the future.

SUMMARY OF THE INVENTION

It is therefore an object of the invention to provide a mobile transmission system which is able to prevent investment of facilities from overlapping and to flexibly match changes thereof in the future.

The above object can be achieved by connecting voice processing devices to both an exchange controlling station and wireless controlling station by independent data lines, and by controlling the voice processing devices from either the exchange controlling station or the wireless controlling stations by bus-type control line.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Hereinafter, a description is given of preferred embodiments of the invention with reference to the accompanying drawings.

Figure 1:
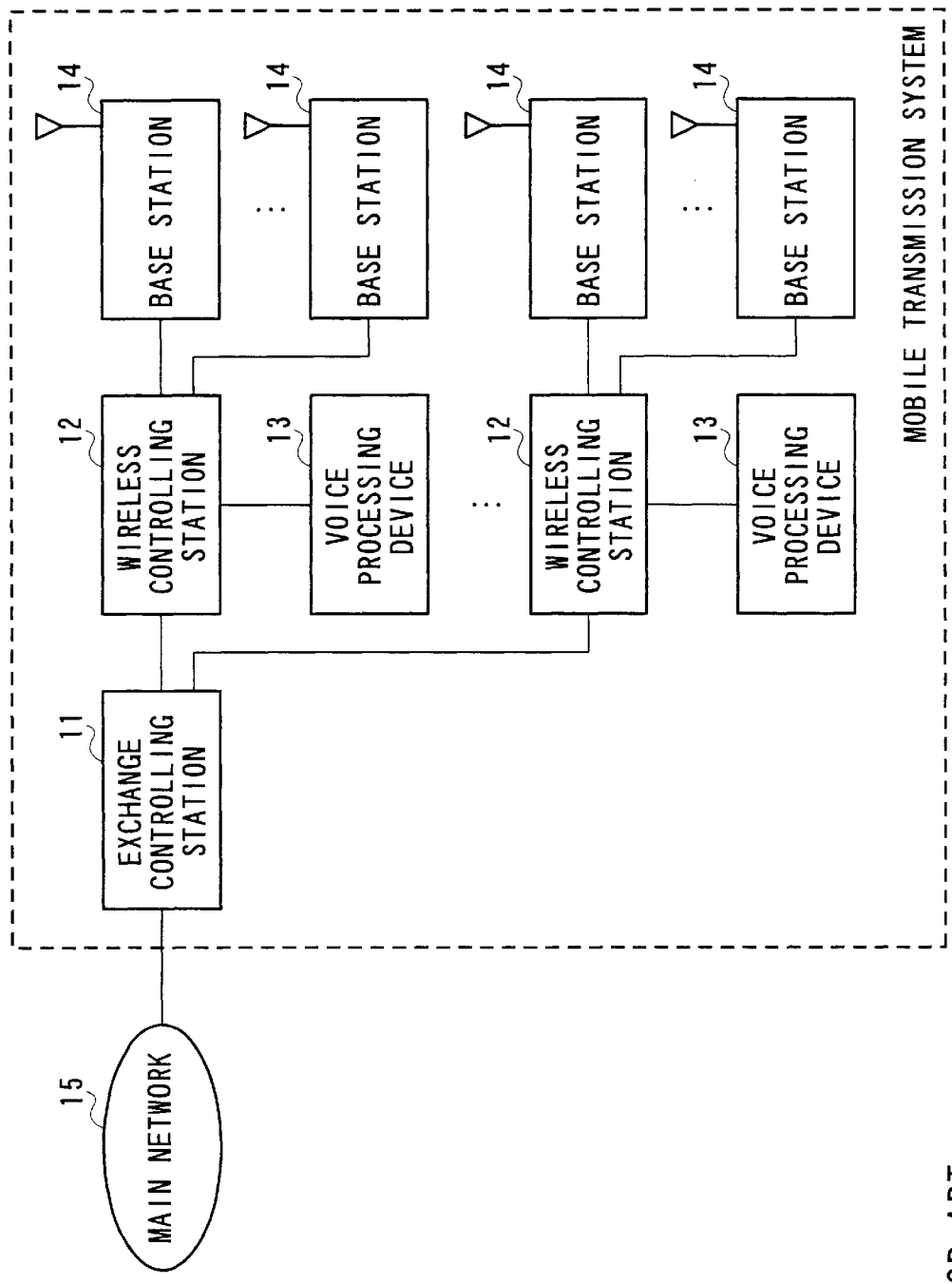
FIG. 1 is a block diagram of a conventional mobile transmission system.
Figure 2:
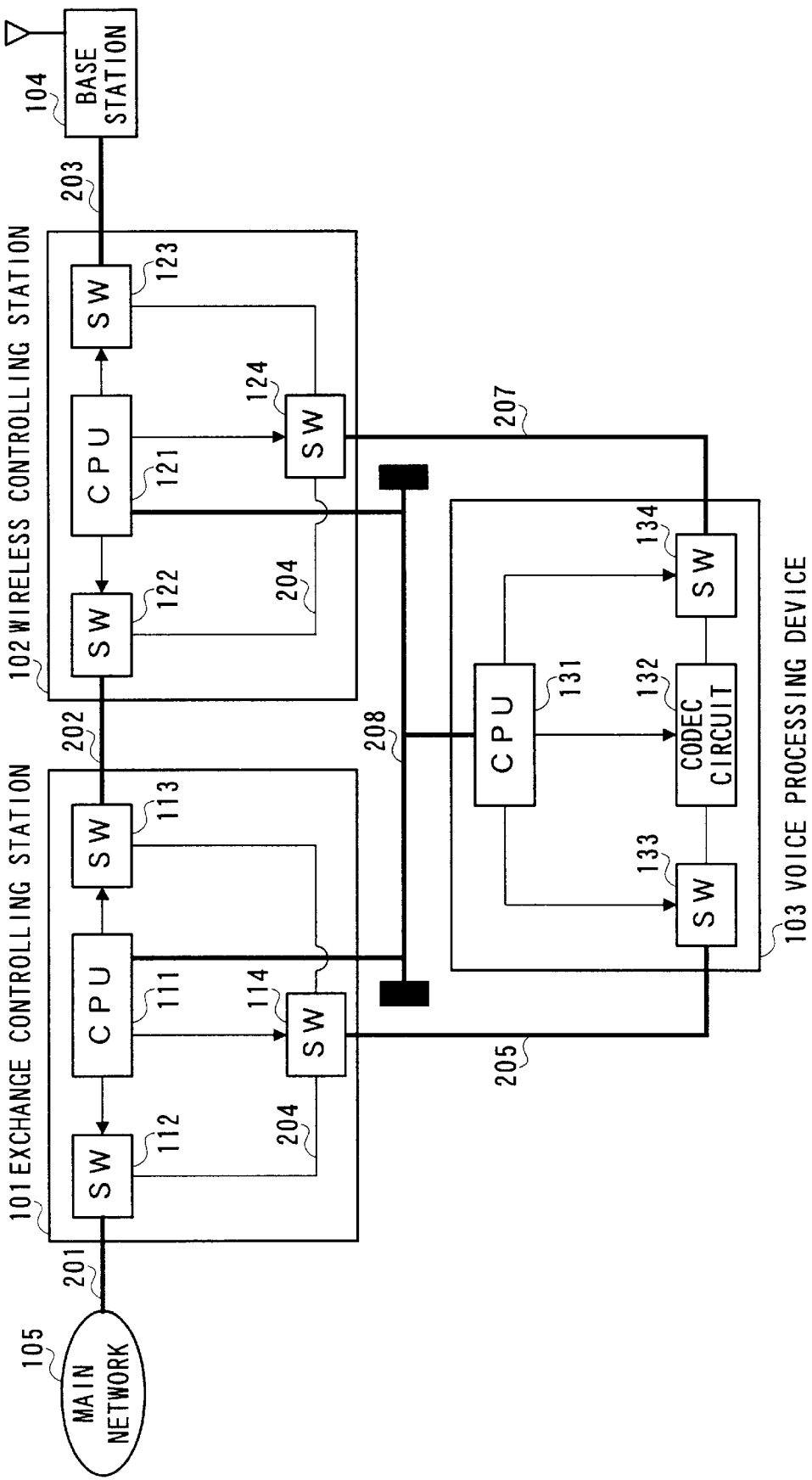
FIG. 2 is a block diagram of a mobile transmission system according to one preferred embodiment of the invention.

FIG. 2 is a block diagram of a mobile transmission system according to one preferred embodiment of the invention.

As shown in FIG. 2, a mobile transmission system according to the invention is mainly composed of an exchange controlling station 101, a wireless controlling station 102, a voice processing device 103, and a base station 104.

The exchange controlling station 101 is connected to the main network 105 of public telephone lines via a first between-station line 201 and is connected to a plurality of wireless controlling stations 102 via a second between-station line 202. The wireless controlling station 102 is connected to a plurality of base stations 104 via a third between-station line 203 and controls wireless channels in the base station 104. Furthermore, for convenience of description, only one each of the wireless controlling station 102 and base 104 are illustrated.

The exchange controlling station 101 is provided with a CPU 111 which controls the entirety of the station, and has a switch 112 (also called an "exchanger") at the connection portion of the first between-station line 201, and another switch 113 at the connection portion with the second between-station line 202. And, an in-station line 204 connects between the switch 112 and switch 113. A switch 114 intervenes in the in-station line 204. The voice processing device 103 is connected to the switch 114 via a first data line 205. These switches 112, 113 and 114 change over lines on the basis of control of the CPU 111.

Furthermore, the switches 112, 113 and 114 are theoretical switches. Although they are explained separately for convenience of description, in actuality, they are physically composed as a single switch portion.

The wireless controlling station 102 is provided with a CPU 121 which controls the entirety of the station, and has a switch 122 at the connection portion with the second between-station line 202 and a switch 123 at the connection portion with the third between-station line 203. And, an in-station line 206 connects the switch 122 and switch 123.

A switch 124 intervenes in the in-station line 206. The voice processing device 103 is connected to the switch 124 via a second data line 207. These switches 122, 123 and 124 change over lines on the basis of control of the CPU 121.

Furthermore, the switches 122, 123 and 124 are theoretical switches. Although they are separately explained for convenience of description, in actuality, they are physically composed as a single switch portion.

The voice processing device 103 converts coded voice signals used in a wireless range to usual voice signals used in the main network 105, and reversely converts usual voice signals to the coded voice signals. The voice processing device 103 is provided with a CPU 131 which controls the entirety of the system, and a plurality of CODEC circuits 132 which converts voice signals. Furthermore, only one CODEC circuit 132 is illustrated for convenience of description.

The wireless controlling station 102 is provided with a CPU 121 which controls the entirety of stations, and has a switch 122 at the connection portion with the second between-station line 202, and another switch 123 at the connection portion with the third between-station line 203.

The voice processing device 103 is provided with a switch 133 which connects the CODEC circuit 132 and the first data line 205, and a switch 134 which connects the CODEC circuits 132 and the second data line 207. These switches 133 and 134 change over lines on the basis of control of the CPU 131.

Furthermore, the switches 133 and 134 are theoretical switches. Although they are explained for convenience of description, in actuality, they are physically composed of a single switch portion.

A control line 208 is a bus to which the CPU 111 of the exchange controlling station 101, the CPU 121 of the wireless controlling station 102, and the CPU 131 of the voice processing device 103 are connected.

Hereinafter, a description is given of actions of a mobile transmission system according to the abovementioned preferred embodiment with reference to FIG. 3 though FIG. 6.

Figure 3:
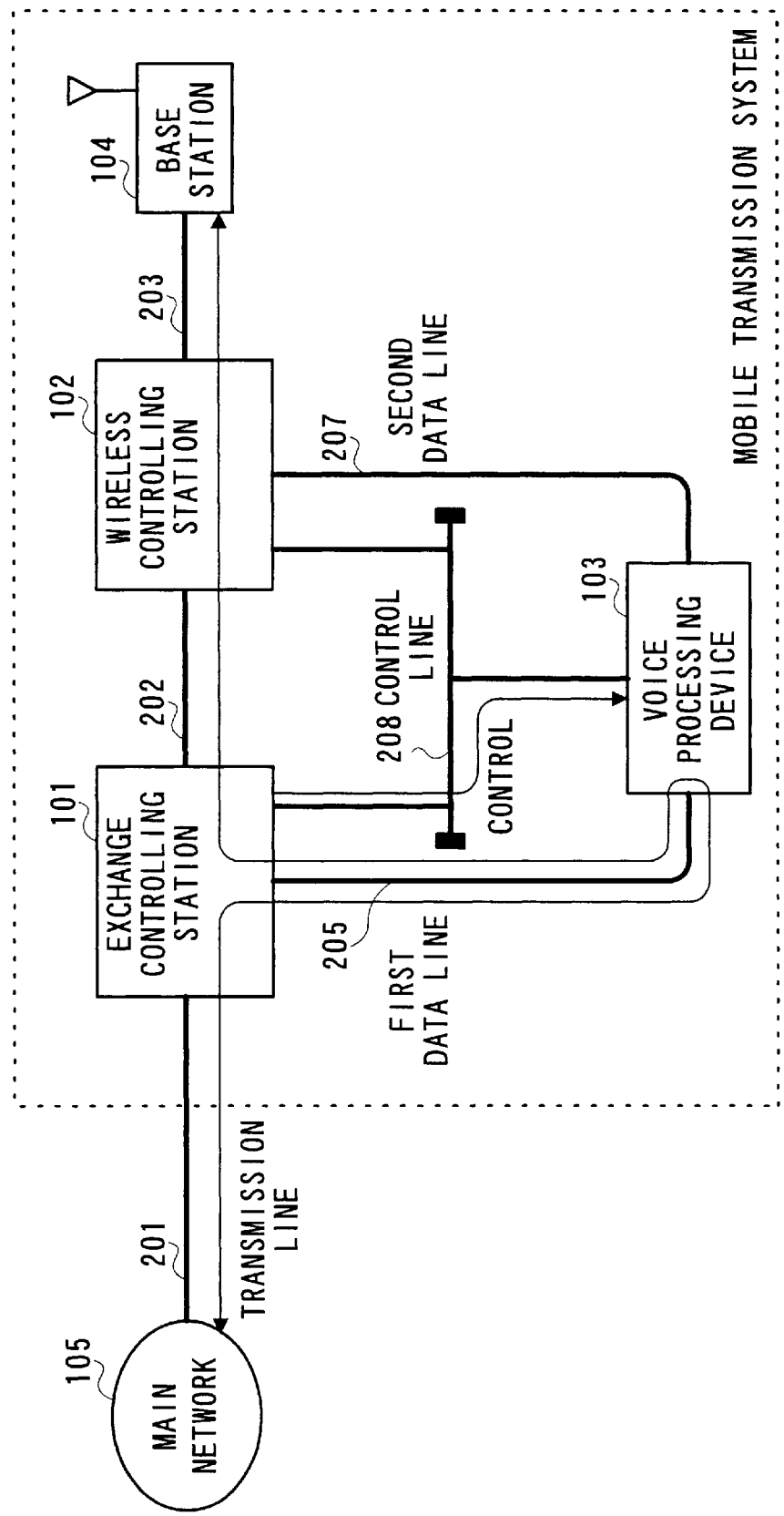
FIG. 3 is a block diagram showing a transmission line in a case where voice processing devices are controlled by an exchange controlling station according to the above preferred embodiment.
Figure 4:
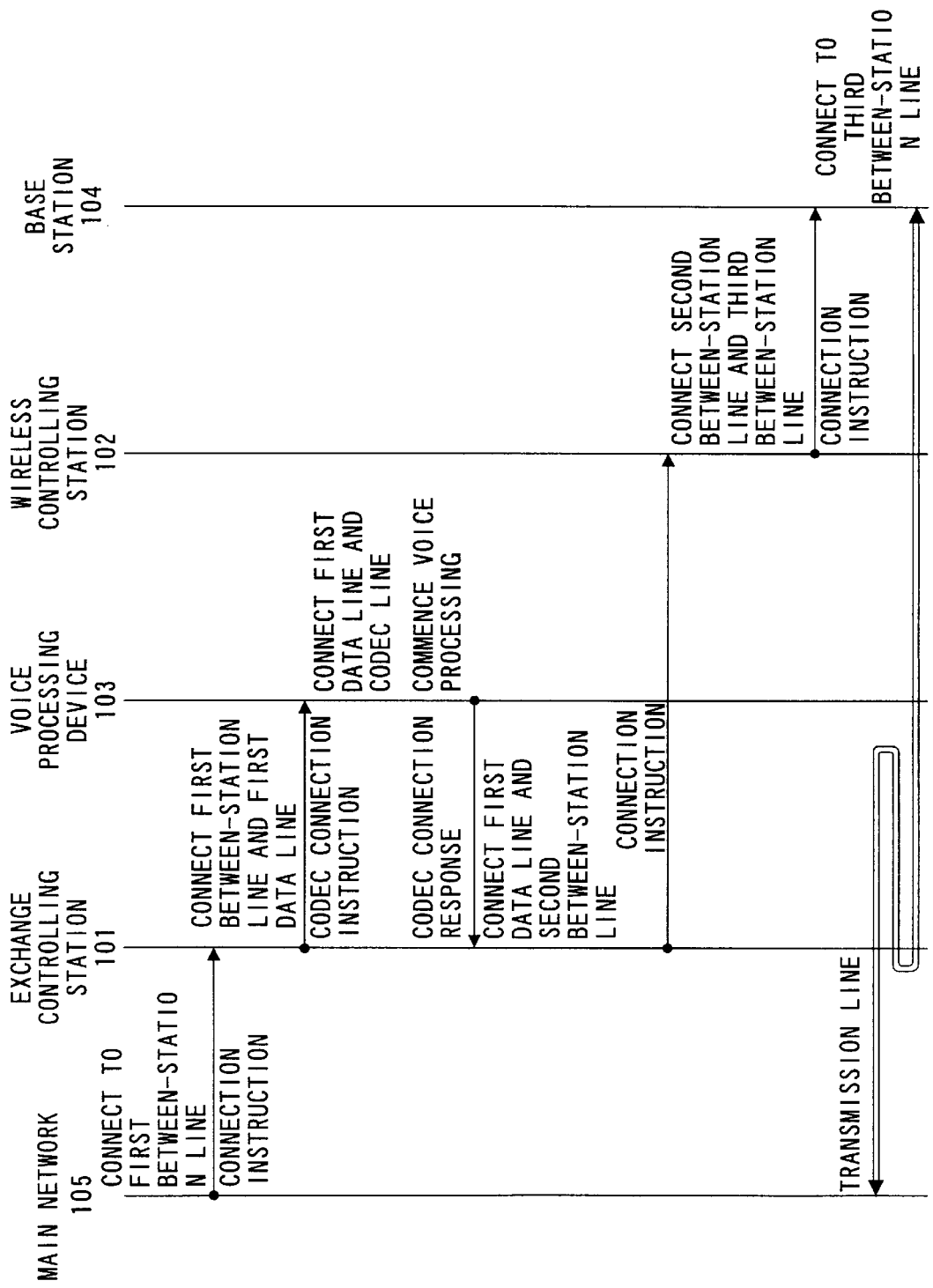
FIG. 4 is a sequence diagram showing actions of a mobile transmission system in a case where voice processing devices are controlled by an exchange controlling station according to the above preferred embodiment.

First, a description is given of a case where voice process is carried out by control of the exchange controlling station, with reference to FIG. 3 and FIG. 4. FIG. 3 is a block diagram showing a transmission line where a voice controlling device is controlled by the exchange controlling station. FIG. 4 is a sequence view showing actions of a mobile transmission system where the voice processing device is controlled by the exchange controlling station.

First, the exchange controlling station 101 receives a connection instruction from the main network 105 via the first between-station line 201. Next, in the exchange controlling station 101, the CPU 111 controls the switches 112 and 114 to connect the first between-station line 201 and first data line 205. At the same time, the CPU 111 transmits a CODEC connection instruction to the voice processing device 103 via a control line 208.

The CPU 131 of the voice processing device 103 controls the switch 133 and connects the first data line 205 to the CODEC line 132, thereby causing the CODEC line 132 to commence a voice process. Next, the voice processing device 103 transmits a response showing the CODEC connection to the exchange controlling station 101 via the control line 208.

The CPU 111 of the exchange controlling station 101 controls the switches 113 and 114 upon receiving a CODEC connection response to connect the first data line 205 and the second between-station line 202. At the same time, the CPU 111 thereof transmits a connection instruction to the wireless controlling station 102.

The CPU 121 of the wireless controlling station 102 controls the switches 122 and 123 upon receiving a connection instruction, thereby causing the second station line 202 and third station line 203 to be connected, wherein the CPU 121 thereof transmits a connection instruction to the base station 104.

As a result of the abovementioned sequence, a bi-directional transmission line is established in the order of the main network 105, first between-station line 201, exchange controlling station 101, first data line 205, voice processing device 103, first data line 205, exchange controlling station 101, second between-station line 202, wireless controlling station 102, third between-station line 203, and base station 104.

Figure 5:
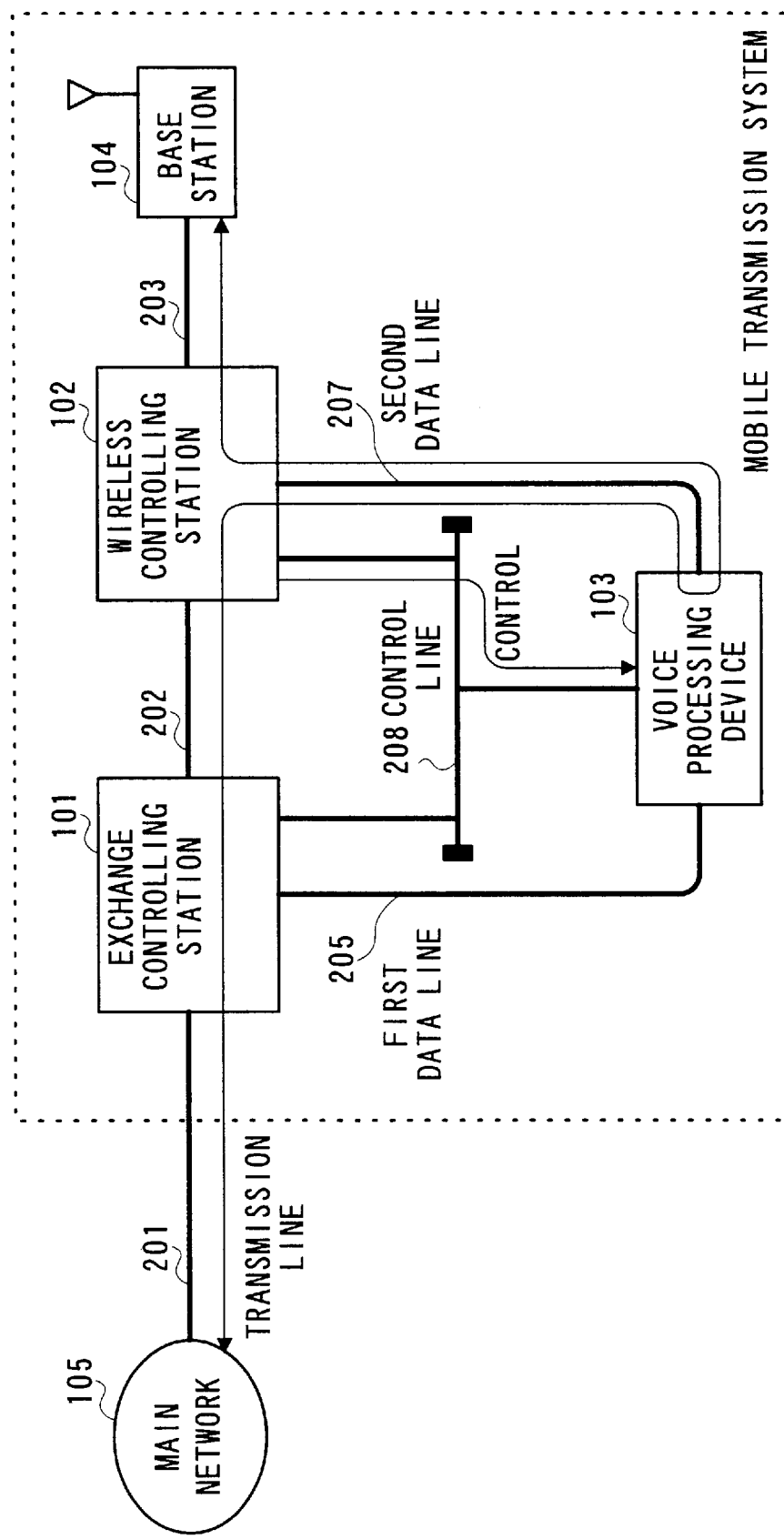
FIG. 5 is a block diagram showing a transmission line in a case where voice processing devices are controlled by a wireless controlling station according to the above preferred embodiment.
Figure 6:
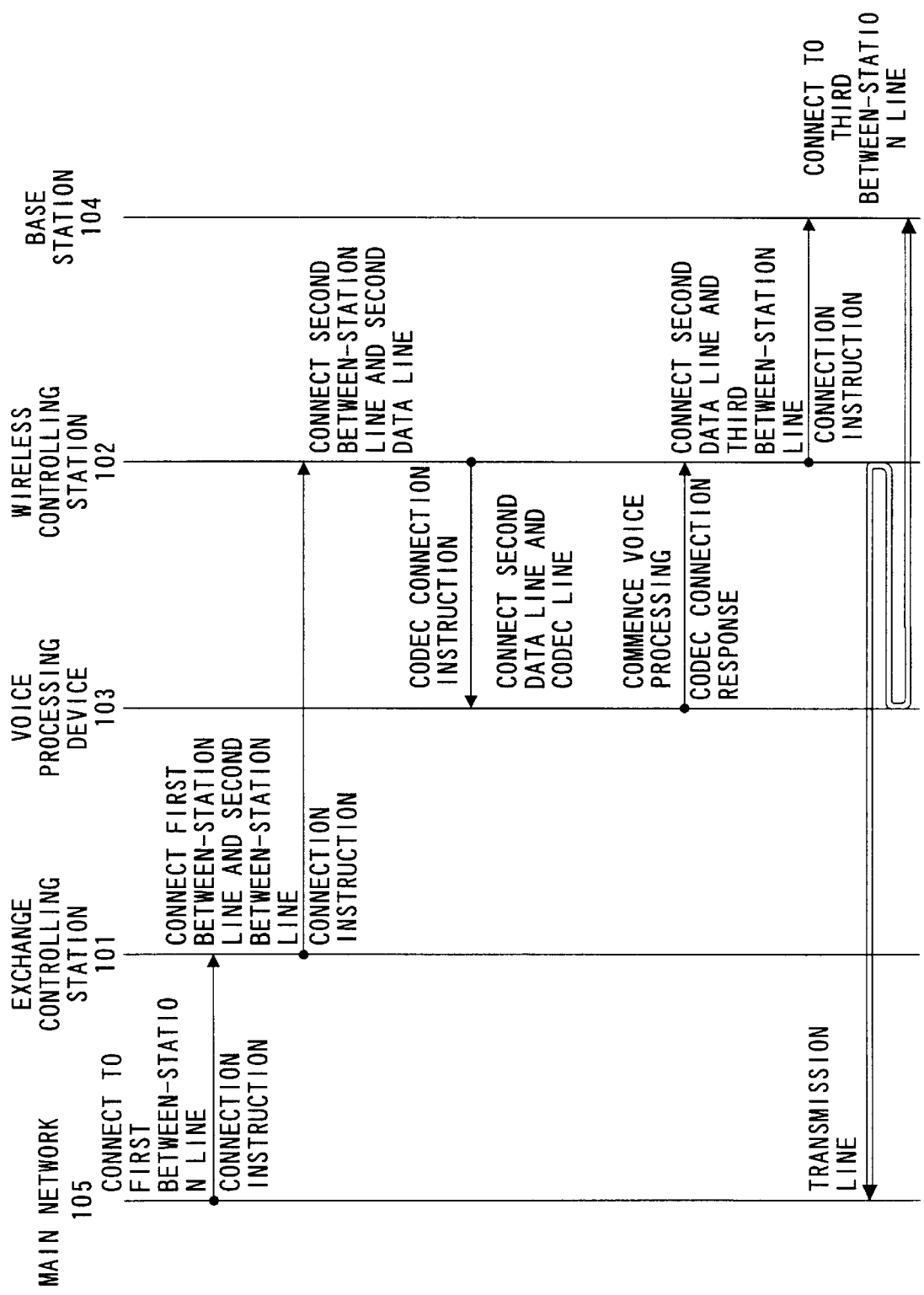
FIG. 6 is a sequence diagram showing actions of a mobile transmission system in a case where voice processing devices are controlled by a wireless controlling station according to the above preferred embodiment.

Next, a description is given of a case where a voice process is carried out by control of the wireless controlling station, with reference to FIG. 5 and FIG. 6. FIG. 5 is a block diagram showing a transmission line in a case where the voice processing device is controlled by a wireless controlling station. FIG. 6 is a sequence diagram showing actions of a mobile transmission system in a case where the voice processing device is controlled by a wireless controlling station.

First, the exchange controlling station 101 receives a connection instruction from the main network 105 via the first between-station line 201. Next, the CPU 111 of the exchange controlling station 101 controls the switches 112 and 113 to connect the first between-station line 201 and the second between-station line 202. At the same time, the CPU 111 thereof transmits a connection instruction to the wireless controlling station 102.

The CPU 121 of the wireless controlling station 102 controls the switches 122 and 124 to connect the second between-station line 202 and the second data line 207. At the same time, the CPU 121 thereof transmits a CODEC connection instruction to the voice processing device 103 via the control line 208.

The CPU 131 of the voice controlling device 103 controls the switch 134 and connects the second data line 207 to the CODEC line 132, whereby the CODEC line 132 is caused to commence a voice process. Next, the voice processing device 103 transmits a response of CODEC connection to the wireless controlling station 102 via the control line 208.

The CPU 121 of the wireless controlling station 102 controls the switches 123 and 124 upon receiving a CODEC connection response, whereby the second data line 207 and third between-station line 203 are caused to be connected to each other. At the same time, the CPU 121 transmits a connection instruction to the base station 104.

As a result of the abovementioned action sequence, a bi-directional transmission line is established in the order of the main network 105, first between-station line 201, exchange controlling station 101, second between-station line 202, wireless controlling station 102, second data line 207, voice processing unit 103, second data line 207, wireless controlling station 102, third station line 203 and base station 104.

In a case where a connection instruction is given from the base station 104, the abovementioned action sequence is completely reversed.

As described above, according to the preferred embodiments of the invention, since an exchange controlling station and a wireless controlling station hold a voice processing device in common, the installation cost can be decreased in comparison with a case where voice processing devices are separately provided.

Furthermore, since the exchange controlling station and wireless controlling station are connected to each other by a bus-type control line, the voice processing device can be independently controlled by both the exchange controlling station and the wireless controlling station.

Furthermore, since the voice processing device is, respectively, connected to the exchange controlling station and the wireless controlling station by independent data lines, no influence is given to any line exchange of the wireless controlling station when exchanging lines from the exchange controlling station to the voice processing device. Furthermore, no influence is given to any line exchange of the exchange controlling station when exchanging lines from the wireless controlling station to the voice processing device.

As described above, according to a mobile transmission system of the invention, it is possible to prevent overlapping investment in facilities and flexibly match future design changes.

The present invention is not limited to the above described embodiments, and various variations and modifications may be possible without departing from the scope of the present invention.

This application is based on the Japanese Patent Application No.HEI10-119559 filed on Apr. 28, 1998, entire content of which is expressly incorporated by reference herein.

What is claimed is:

1. A mobile transmission system comprising:

a wireless controlling apparatus that controls wireless channels of base stations;

an exchange controlling apparatus that mutually connects said wireless controlling apparatus to public telephone networks; and a voice processing device that is connected to both said wireless controlling apparatus and said exchange controlling apparatus and converts voice signals by controls independently performed by both said wireless controlling apparatus and said exchange controlling apparatus;

wherein said wireless controlling apparatus includes:

a first changing device that outputs coded voice signals inputted from an exchange controlling apparatus to a base station, and outputs non-coded voice signals to said voice processing device;

a second changing device that outputs coded voice signals inputted from a base station to said voice processing device when the voice processing device is controlled in the wireless controlling apparatus, and outputs the coded voice signals to the exchange controlling apparatus when the voice processing device is controlled by the exchange controlling apparatus; and a third changing device that outputs coded voice signals inputted from the voice processing device to a base station and outputs non-coded voice signals to the exchange controlling apparatus.

2. A mobile transmission system as set forth in claim 1, wherein said voice processing device is connected to a wireless controlling apparatus and an exchange controlling apparatus by a bus-type control circuit.

3. A mobile transmission system as set forth in claim 1, wherein said voice processing device is connected to either said wireless controlling apparatus or exchange controlling apparatus by independent data lines.

4. A mobile transmission system comprising:

a wireless controlling apparatus that controls wireless channels of base stations;

an exchange controlling apparatus that mutually connects said wireless controlling apparatus to public telephone networks; and a voice processing device that is connected to both said wireless controlling apparatus and said exchange controlling apparatus and converts voice signals by controls independently performed by both said wireless controlling apparatus and said exchange controlling apparatus;

wherein said exchange controlling apparatus includes:

a non-coded signal changing device that outputs non-coded voice signals inputted from a public telephone network to a voice processing device when the voice processing device is controlled in the exchanging controlling appartus and outputs the non-coded voice signals to a wireless controlling apparatus where the voice processing device is controlled by the wireless controlling apparatus;

a first coded signal changing device that outputs coded voice signals inputted from the wireless controlling apparatus to the voice processing device and outputs the non-coded voice signals to the public telephone network; and a second coded signal changing device that outputs the coded voice signals inputted from the voice processing device to the wireless controlling apparatus and outputs the non-coded voice signals to the public telephone network.

5. The mobile transmission system as set forth in claim 4, wherein said voice processing device is connected to a wireless controlling apparatus and an exchange controlling apparatus by a bus-type control circuit.

6. The mobile transmission system as set forth in claim 4, wherein said voice processing device is connected to either said wireless controlling apparatus or exchange controlling apparatus by independent data lines.

* * * * *

UNITED STATES PATENT AND TRADEMARK OFFICE
CERTIFICATE OF CORRECTION

PATENT NO.   : 6,246,869 B1
DATED        : June 12, 2001
INVENTOR(S)  : T. Furuta It is certified that error appears in the above-identified patent and that said Letters Patent is hereby corrected as shown below:

<u>Column 6, claim 4,</u>
Line 32, "appartus" should be -- apparatus --.

Signed and Sealed this

Nineteenth Day of February, 2002

Attest:

JAMES E. ROGAN
*Attesting Officer*    *Director of the United States Patent and Trademark Office*